United States Patent
Dingwell et al.

(10) Patent No.: US 6,474,941 B2
(45) Date of Patent: Nov. 5, 2002

(54) VARIABLE STATOR VANE BUSHING

(75) Inventors: William Terence Dingwell, West Chester, OH (US); Daniel Padraic O'Reilly, Hamilton, OH (US); Thomas Carl Mesing, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/733,452

(22) Filed: Dec. 8, 2000

(65) Prior Publication Data

US 2002/0071760 A1 Jun. 13, 2002

(51) Int. Cl.[7] .............................................. F01D 17/16
(52) U.S. Cl. ........................ 415/162; 415/160; 415/229
(58) Field of Search ................................. 415/148, 159, 415/160, 161, 162, 229; 156/246, 278, 307.1, 307.3

(56) References Cited

U.S. PATENT DOCUMENTS

| | | | |
|---|---|---|---|
| 2,907,612 A | * | 10/1959 | White ......................... 384/298 |
| 3,303,992 A | | 2/1967 | Johnson ....................... 230/114 |
| 3,527,053 A | | 9/1970 | Horn |
| 3,873,168 A | * | 3/1975 | Viola et al. .................. 384/398 |
| 3,979,903 A | | 9/1976 | Hull, Jr. et al. |
| 4,068,471 A | | 1/1978 | Simmons |
| 4,308,801 A | | 1/1982 | Cooper et al. |
| 4,758,101 A | | 7/1988 | Roof, Sr. et al. |
| 4,798,771 A | | 1/1989 | Vogel |
| 4,808,069 A | * | 2/1989 | Bonner et al. ............... 415/160 |
| 4,932,795 A | | 6/1990 | Guinn |
| 4,958,489 A | | 9/1990 | Simmons |
| 5,069,559 A | | 12/1991 | Muller et al. ............... 384/277 |
| 5,123,240 A | | 6/1992 | Frost et al. |
| 5,174,105 A | | 12/1992 | Hines |
| 5,252,780 A | | 10/1993 | Ramos et al. |
| 5,279,109 A | | 1/1994 | Liu et al. |
| 5,281,087 A | | 1/1994 | Hines |
| 5,301,500 A | | 4/1994 | Hines |
| 5,308,226 A | | 5/1994 | Venkatasubbu et al. |
| 5,328,327 A | * | 7/1994 | Naudet ....................... 415/160 |
| 5,593,275 A | | 1/1997 | Venkatasubbu et al. |
| 5,622,473 A | | 4/1997 | Payling |
| 5,775,092 A | | 7/1998 | Hines |
| 5,807,072 A | | 9/1998 | Payling |
| 5,814,912 A | | 9/1998 | Ross |
| 5,992,152 A | | 11/1999 | Weres et al. |
| 6,146,093 A | * | 11/2000 | Lammas et al. ............ 415/160 |
| 6,170,990 B1 | * | 1/2002 | Hawkins ...................... 384/297 |

* cited by examiner

*Primary Examiner*—Edward K. Look
*Assistant Examiner*—Richard A. Edgar
(74) *Attorney, Agent, or Firm*—William Scott Andes; Armstrong Teasdale LLP

(57) ABSTRACT

A variable stator vane assembly for a gas turbine engine including a bushing that facilitates extending a useful life of the stator vane assembly is described. The stator vane assembly includes a spacer and a vane secured to an engine casing. The bushing is between the spacer and vane, and prevents the spacer and the vane from contacting the engine casing. The bushing is fabricated from several materials formed in a matrix, such that at least a portion of the bushing is electrically conductive. During engine operation, a conductive path is realized through the bushing that discharges electrical charges.

20 Claims, 4 Drawing Sheets

VARIABLE STATOR VANE BUSHING

BACKGROUND OF THE INVENTION

This invention relates generally to gas turbine engine variable stator vane assemblies and, more particularly, to bushings used within the variable stator vane assembly.

Gas turbine engines include a high pressure compressor, a combustor, and a high pressure turbine. The high pressure compressor includes a rotor, and a plurality of stages. The rotor is surrounded by a casing, and each stage includes a row of rotor blades and a row of stator vanes. The casing supports the stator vanes, and the rotor supports the rotor blades. The stator vane rows are between the rotor blade rows and direct air flow toward a subsequent downstream rotor blade row. Furthermore, because at least some known gas turbine engines include water injection systems to facilitate reducing operating engine temperatures, the stator vane rows are exposed to a water/air mist mixture.

Variable stator vane assemblies are utilized to control the amount of air flowing through the compressor to facilitate optimizing performance of the compressor. Each variable stator vane assembly includes a variable stator vane which extends between adjacent rotor blades. The variable stator vane is rotatable about an axis such that the stator vane is positionable in a plurality of orientations to direct air flow through the compressor.

At least some known variable vane assemblies include a variable vane, a bushing, and a spacer. The bushing extends between the variable vane and the casing, and between the spacer and the casing, to prevent both the spacer and the vane from contacting the casing. Because of wear considerations, the bushings are typically fabricated from materials having high durability and low friction. However, because the variable stator vane assembly is exposed to the water/air mixture, to minimize corrosion and oxidation, the bushings are also typically fabricated from non-metallic materials.

BRIEF SUMMARY OF THE INVENTION

In an exemplary embodiment, a variable stator vane assembly for a gas turbine engine includes a bushing that facilitates extending a useful life of the variable stator vane assembly. The stator vane assembly includes a spacer and a vane secured to an engine casing. The bushing is between the spacer and vane, and prevents the spacer and the vane from contacting the engine casing. The bushing is fabricated such that at least a portion of the bushing is electrically conductive.

During operation, as the engine operates, a water/air mixture flowing through the engine may cause a static electrical charge to develop on metallic components of the variable stator vane assembly. Because the bushing is fabricated such that at least a portion of the bushing is electrically conductive, a conducive path is realized through the bushing, such that electrical charges induced within the variable stator vane assembly are discharged through the bushing to ground. As a result, the bushing facilitates reducing or eliminating electrical charges within the variable stator vane assembly in a cost effective and reliable manner.

DETAILED DESCRIPTION OF THE INVENTION

Figure 1:
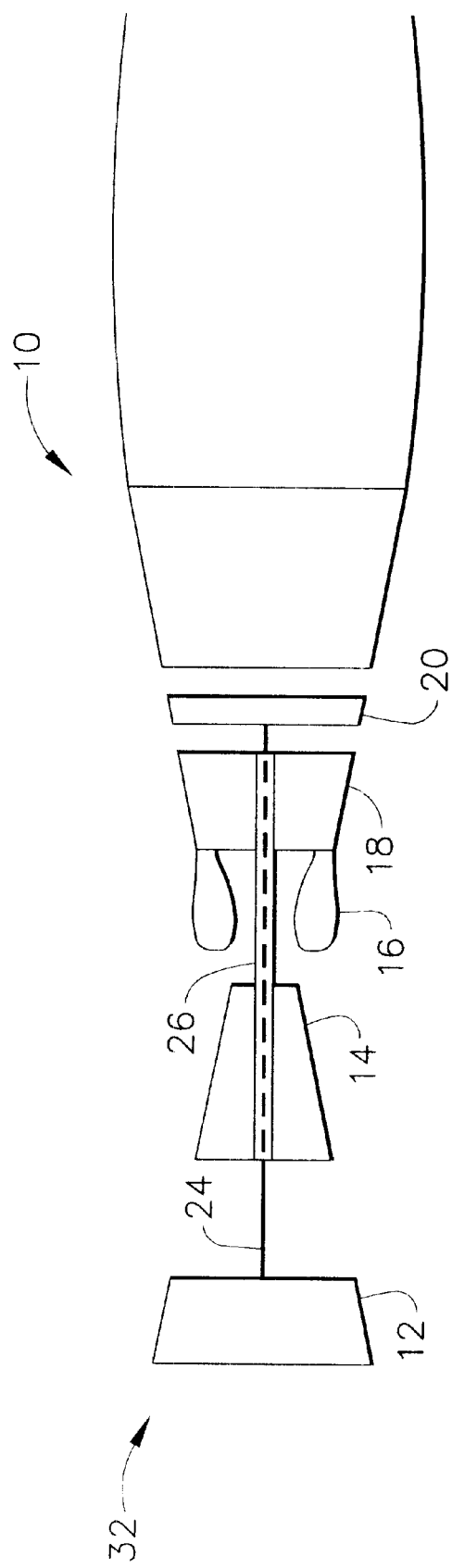
FIG. 1 is schematic illustration of a gas turbine engine.

FIG. 1 is a schematic illustration of a gas turbine engine 10 including a low pressure compressor 12, a high pressure compressor 14, and a combustor assembly 16. Engine 10 also includes a high pressure turbine 18, and a low pressure turbine 20 arranged in a serial, axial flow relationship. Compressor 12 and turbine 20 are coupled by a first shaft 24, and compressor 14 and turbine 18 are coupled by a second shaft 26. In one embodiment, engine 10 is an LM6000 engine commercially available from General Electric Company, Cincinnati, Ohio.

In operation, air flows through low pressure compressor 12 from an upstream side 32 of engine 10 and compressed air is supplied from low pressure compressor 12 to high pressure compressor 14. Compressed air is then delivered to combustor assembly 16 where it is mixed with fuel and ignited. The combustion gases are channeled from combustor 16 to drive turbines 18 and 20.

Figure 2:
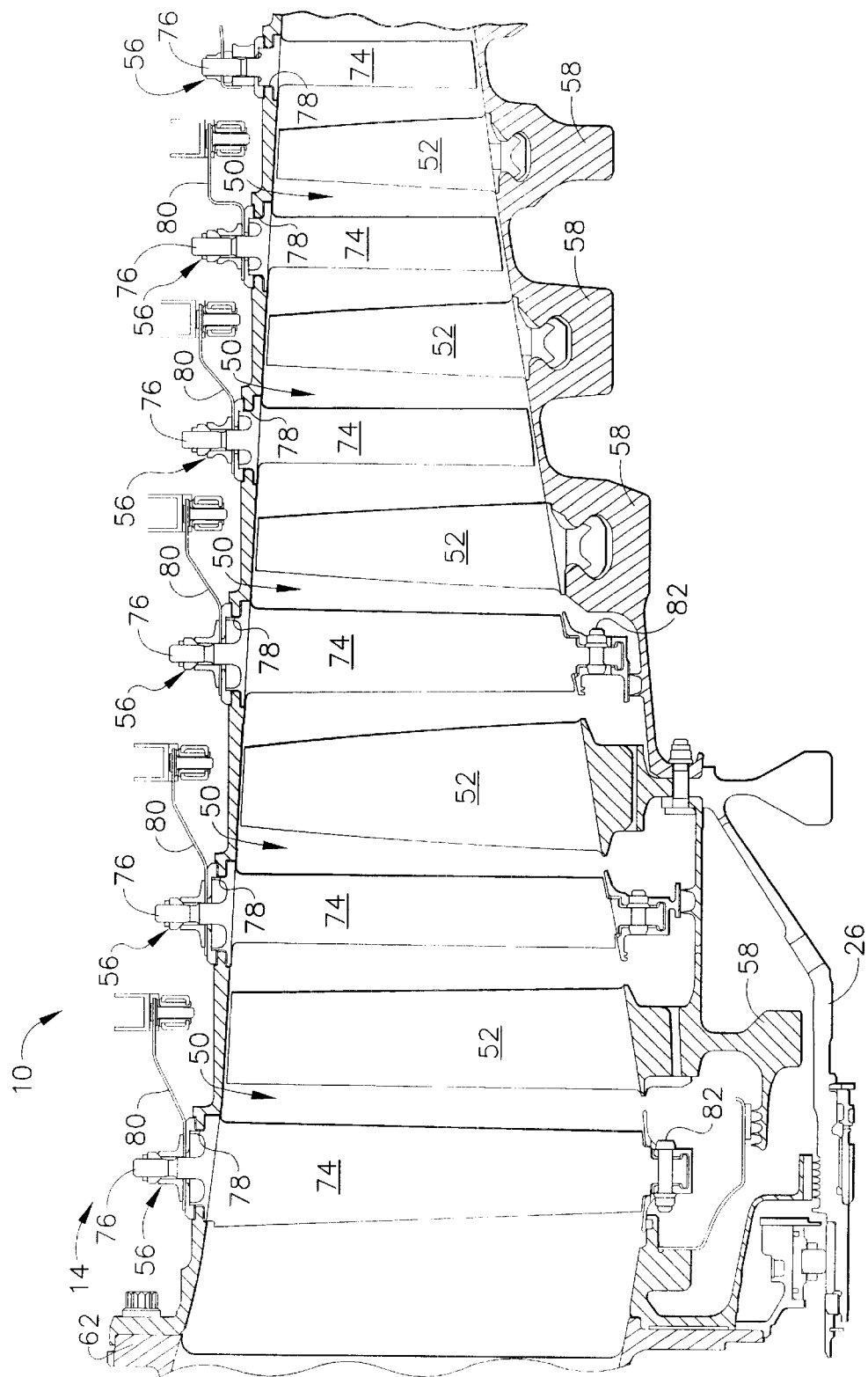
FIG. 2 is a schematic view of a section of a high pressure compressor used with the engine shown in FIG. 1.

FIG. 2 is a schematic view of a section of high pressure compressor 14 for turbine engine. Compressor 14 includes a plurality of stages 50, and each stage 50 includes a row of rotor blades 52 and a row of variable stator vane assemblies 56. Rotor blades 52 are typically supported by rotor disks 58, and are connected to rotor shaft 26. Rotor shaft 26 is a high pressure shaft that is also connected to high pressure turbine 18 (shown in FIG. 1). Rotor shaft 26 is surrounded by a stator casing 62 that supports variable stator vane assemblies 56.

Each variable stator vane assembly 56 includes a variable vane 74 and a vane stem 76. Vane stem 76 protrudes through an opening 78 in casing 62. Each variable vane assembly 56 also includes a lever arm 80 extending from variable vane 74 that is utilized to rotate variable vanes 74. Vanes 74 are oriented relative to a flow path through compressor 14 to control air flow therethrough. In addition, at least some vanes 74 are attached to an inner casing 82.

Figure 3:
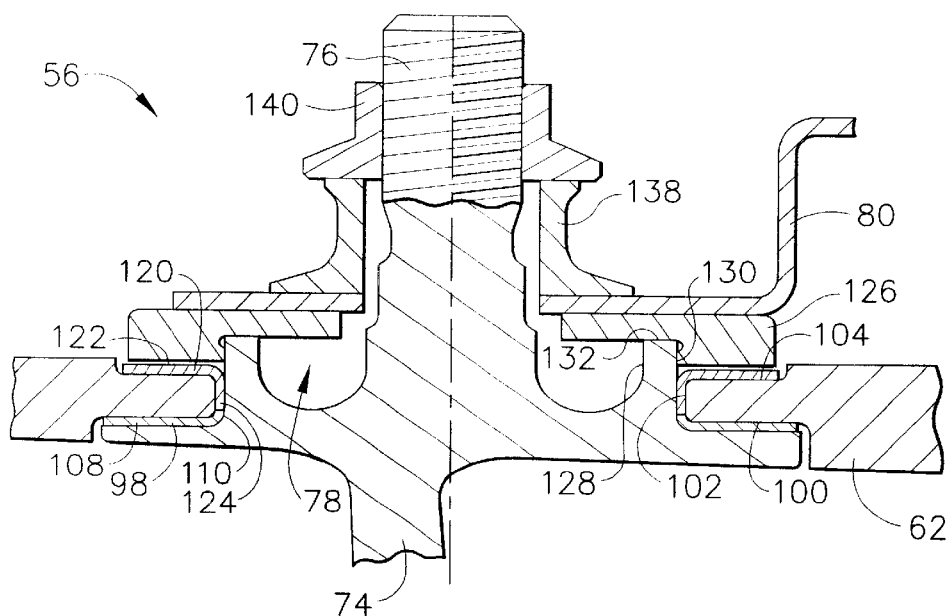
FIG. 3 is a schematic view of a variable stator vane assembly including a bushing and used with the high pressure compressor shown in FIG. 2.

FIG. 3 is an enlarged schematic view of variable stator vane assembly 56. More specifically, in one embodiment, variable stator vane assemblies 56 are utilized in an inlet guide vane (IGV), a first, and a second stage 50 (shown in FIG. 2) of an LM 6000 engine commercially available from General Electric Company, Cincinnati, Ohio. Each variable stator vane assembly 56 includes variable vane 74 and a washer 98 positioned on variable vane 74. Casing 62 supports variable vane 74 and includes a first recessed portion 100, an inner wall 102, and a second recessed portion 104. Openings 78 are formed by inner wall 102. Washer 98 includes a first portion 108 and a second portion 110. Washer first portion 108 seats within first recessed portion 100 and separates variable vane 74 from casing 62. Washer second portion 110 extends substantially perpendicularly from washer first portion 108 into opening 78. Washer second portion 110 contacts inner wall 102 to separate variable vane 74 from casing 62.

Variable stator vane assembly 56 also includes a bushing 120, described in more detail below, having an annular first portion 122 and an annular second portion 124 that is substantially cylindrical. Variable vane assembly bushing first portion 122 extends radially outward from bushing second portion 124. First portion 122 is positioned on casing 62 and extends along second recessed portion 104.

A spacer 126 contacts bushing 120 and is separated from casing 62 by bushing 120. In addition, bushing 120 contacts washer 98 and separates a portion of washer 98 from spacer 126. Variable vane 74 also includes a ledge 128 including an outer wall 130 and a spacer seating surface 132. Ledge 128 surrounds vane stem 76, and vane stem 76 and ledge 128 extend through casing opening 78. Bushing second portion 124 extends in close tolerance along casing inner wall 102 and prevents an outer wall 130 of ledge 128 from contacting casing inner wall 102.

Variable vane assembly lever arm 80 is positioned around vane stem 76 and in contact with spacer 126. Lever arm 80 is utilized to adjust the angle of vane 74, and thus alter the flow of air through the compressor. In addition, variable vane assembly 56 includes a sleeve 138 that contacts lever arm 80 and a lever arm nut 140 that contacts sleeve 138. Lever arm nut 140 cooperates with vane stem 76 and maintains variable vane assembly 56 in contact with casing 62.

Figure 4:
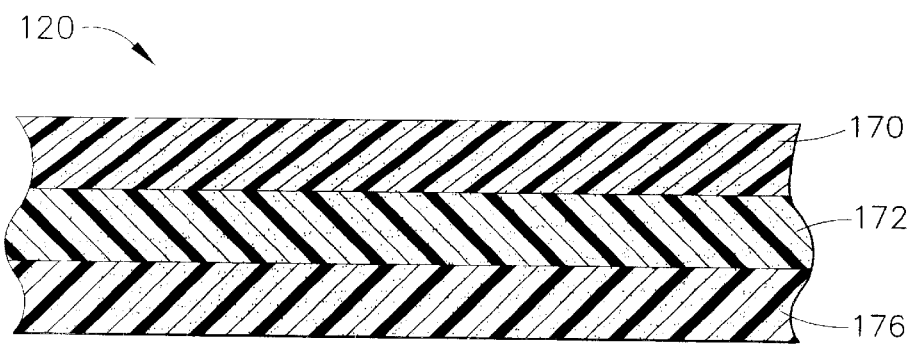
FIG. 4 is an enlarged cross-sectional view of the bushing shown in FIG. 3.

FIG. 4 is an enlarged cross-sectional view of an exemplary embodiment of a variable vane assembly bushing 120. Bushing 120 includes a first layer 170, a second layer 172, and a third layer 176. More specifically, variable stator vane assembly bushing 120 is fabricated from a matrix formed of at least three different layers. In one embodiment, Teflon fibers and glass fibers are included in the matrix used in fabricating variable vane assembly bushing 120.

Bushing 120 is impregnated with a resin to bond the matrix. In one embodiment, the resin is a polyimide resin Skybord 703 commercially available from Monsanto Corp., St. Louis, Mo. An amount of conductive material is added to the resin. In one embodiment, the conductive material includes, but is not limited to, graphite or aluminum.

The amount of conductive material added to the resin is pre-selected to ensure that as the resin cures to bond the materials used in fabricating bushing 120, the conductive material is homogeneously distributed throughout bushing 120. Accordingly, a conductive path is realized through bushing first portion 122 and bushing second portion 124. More specifically, the amount of conductive material added to the resin is variable and selected such that to enable bushing 120 to conduct a pre-determined amount of current with a pre-determined resistance. In addition, the addition of resin to bushing 120 facilitates increasing a durability of bushing 120 and lowering a coefficient of friction of bushing 120.

During operation, as variable stator vane assembly 56 is exposed to a water/air mixture flowing through engine 10 (shown in FIGS. 1 and 2), a static charge may develop on metallic components of variable vane assembly 56 (shown in FIGS. 2 and 3). Continued exposure to the static charge may result in arcing and may result in premature failure of the variable stator vane assembly, triggering internal fire alarms, or detonating external fuel/air mixtures that may be present. Because material used in fabricating bushing 120 is bonded with resin including conductive material, a conductive path is realized through bushing 120, electrical charges induced within variable stator vane assembly 56 are discharged through bushing 120 to ground. As a result, bushing 120 facilitates extending a useful service life for variable stator vane assembly 56, and reduces or eliminates the previously mentioned failure modes, since electrical charge build-up of metallic components within variable stator vane assembly 56 is substantially reduced, or eliminated.

Figure 5:
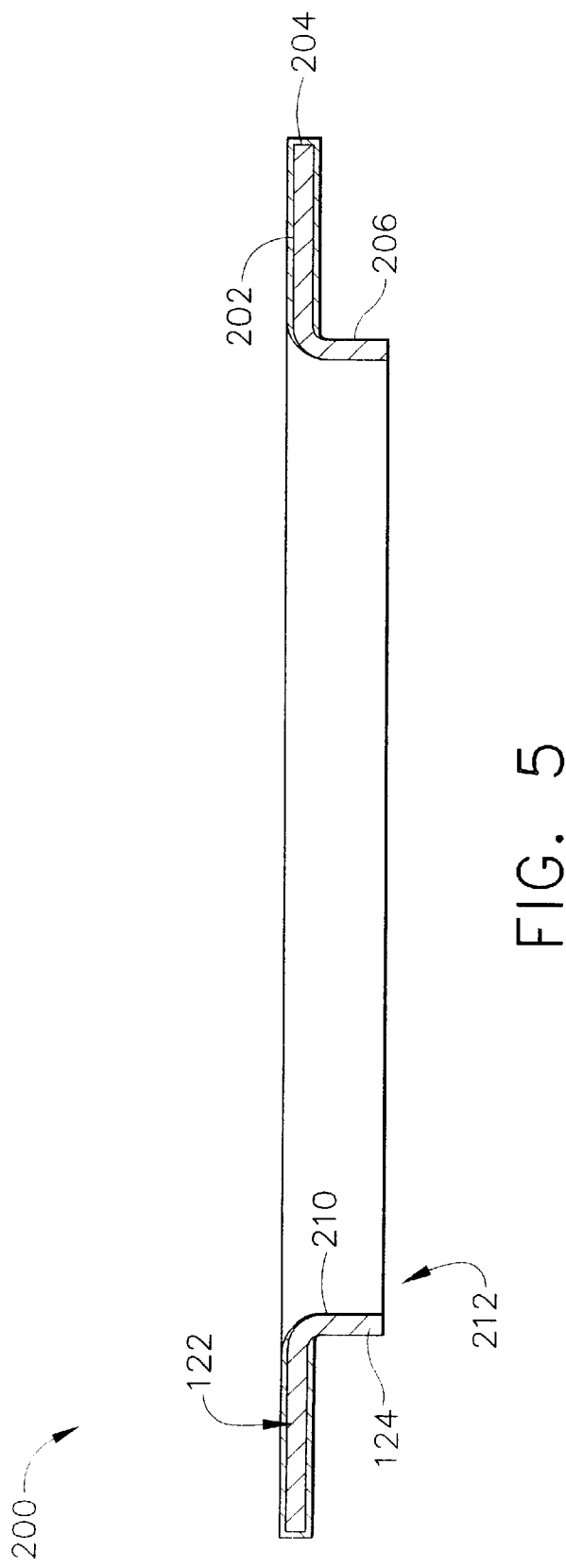
FIG. 5 is side view of an alternative embodiment of a bushing that may be used with the variable stator vane assembly shown in FIG. 3.

FIG. 5 is side view of an alternative embodiment of a bushing 200 that may be used with variable stator vane assembly 56 (shown in FIGS. 2 and 3). Bushing 200 is substantially similar to bushing 120 shown in FIGS. 3 and 4, and components in bushing 200 that are identical to components of bushing 120 are identified in FIG. 5 using the same reference numerals used in FIGS. 3 and 4. Accordingly, bushing 200 includes first portion 122 and second portion 124. In addition, bushing 200 includes first layer 170 (shown in FIG. 4), second layer 172 (shown in FIG. 4), and third layer 176 (shown in FIG. 4) and is fabricated from a matrix formed of at least three different layers.

Bushing 200 is coated with a conductive material. In one embodiment, the coating is Xylan 1401 commercially available from Whitford Corporation, West Chester, Pa. Specifically, only bushing first portion 122 is coated with the conductive material. More specifically, bushing first portion 122 includes an upper surface 202, an outer edge 204, and a lower surface 206. The conductive material coating is applied to bushing first portion upper surface 202, outer edge 204, and lower surface 206, but is not applied to bushing second portion 124 or to a sidewall 210 defining a bore 212 extending concentrically through bushing 200.

The coating acts as an electrical conductor such that a conductive path is realized on bushing 200. The coating is selected to conduct a pre-determined amount of current with a pre-determined resistance. More specifically, the conductive path extends between vane spacer 126 (shown in FIG. 3) around bushing projection edge 204 to bushing first portion lower surface 206. Because bushing first portion lower surface 206 is adjacent casing 62 (shown in FIG. 3), the conductive path extends through casing 62 to ground. In addition, because the coating is fabricated from a low friction material, the coating also acts as a wear surface against casing 62 and vane spacer 126. Furthermore, although bushing 200 is positioned in tight tolerance between casing inner wall 102 (shown in FIG. 3) and vane ledge outer wall 130 (shown in FIG. 3), because the coating is not applied against bushing bore sidewall 210 or bushing second portion 124, the coating may be applied to existing bushings (not shown) without compromising a clearance fit between vane ledge outer wall 130 and casing 62.

The above-described variable stator vane assembly is cost-effective and highly reliable. The stator vane assembly includes a bushing that forms a conductive path between the variable stator vane spacer and the casing. The bushing facilitates discharging electrical charges from the variable stator vane assembly to ground. More specifically, the bushing facilitates substantially reducing or eliminated electrical charge build-up of metallic components within the variable stator vane assembly. As a result, the bushing facilitates reducing or eliminating electrical charges within the variable stator vane assembly in a cost effective and reliable manner.

While the invention has been described in terms of various specific embodiments, those skilled in the art will recognize that the invention can be practiced with modification within the spirit and scope of the claims.

What is claimed is:

1. A method for manufacturing a bushing for a gas turbine engine variable stator vane, the bushing including a substantially cylindrical portion and an annular projection extending radially outward from the cylindrical portion, said method comprising the steps of:

forming a plurality of layers from at least one material; and forming the bushing from the material layer such that an electrically conductive path is defined between a top surface and a bottom surface of the bushing annular projection.

2. A method in accordance with claim 1 wherein said step of forming a plurality of layers further comprises the step of forming a three material matrix from at least three layers.

3. A method in accordance with claim 1 wherein said step of impregnating the bushing with a conductive material such that the conductive material is substantially homogenous throughout the bushing.

4. A method in accordance with claim 3 wherein said step of impregnating the bushing further comprises the step of bonding the layers with a resin including a conductive material.

5. A method in accordance with claim 3 wherein said step of impregnating the bushing further comprises the step of impregnating the bushing with conductive material such that the bushing electrically conducts a pre-determined current with a pre-determined resistance.

6. A method in accordance with claim 1 wherein said step of forming the bushing further comprises the step of coating the bushing annular portion with a conductive material.

7. A bushing for a gas turbine engine variable stator vane, said bushing comprising a body comprising an annular projection and a substantially cylindrical portion, said annular projection extending radially outward from said substantially cylindrical portion, at least a portion of said bushing is electrically conductive such that an electrically conductive path is defined between a top surface and a bottom surface of said bushing annular projection.

8. A bushing in accordance with claim 7 wherein said bushing further comprising a plurality of layers formed from a combination of at least three materials.

9. A bushing in accordance with claim 8 wherein said plurality of layers are bonded with a resin including a conductive material.

10. A bushing in accordance with claim 9 wherein the conductive material is substantially homogenous throughout said bushing.

11. A bushing in accordance with claim 7 wherein said bushing body is electrically conductive.

12. A bushing in accordance with claim 7 wherein said bushing annular portion is coated with a conductive material.

13. A bushing in accordance with claim 7 wherein said bushing is configured to electrically conduct a pre-determined current with a pre-determined resistance.

14. A variable stator vane for a gas turbine engine including a casing, said stator vane comprising:

a spacer;

a movable vane; and a bushing between said spacer and said vane, said bushing configured to prevent said spacer and said vane from contacting the gas turbine engine casing, said bushing comprising an annular projection and a substantially cylindrical portion, said annular projection extending radially outward from said substantially cylindrical portion, at least a portion of said bushing is electrically conductive such that an electrically conductive path is defined between a top surface and a bottom surface of said bushing annular projection.

15. A variable stator vane in accordance with claim 14 wherein said bushing is further comprising a plurality of layers.

16. A variable stator vane in accordance with claim 14 wherein said bushing is impregnated with a conductive material, such that the conductive material homogenous throughout said bushing, said plurality of layers are formed from at least three materials.

17. A variable stator vane in accordance with claim 16 wherein said bushing plurality of layers are bonded with a resin including a conductive material.

18. A bushing in accordance with claim 14 wherein said bushing annular projection is coated with a conductive material.

19. A bushing in accordance with claim 18 wherein said bushing annular projection is electrically conductive, said bushing cylindrical portion is non-conductive.

20. A bushing in accordance with claim 15 wherein said bushing is configured to electrically conduct a pre-determined current with a pre-determined resistance.

* * * * *